US012651282B2

(12) United States Patent
Grimm et al.

(10) Patent No.: US 12,651,282 B2
(45) Date of Patent: Jun. 9, 2026

(54) INTERACTIVE SYSTEM TO ENABLE VEHICLE EVALUATION AND SALE

(71) Applicant: GM Global Technology Operations LLC, Detroit, MI (US)

(72) Inventors: Donald K. Grimm, Utica, MI (US); Manoj Kumar Sharma, Troy, MI (US); Akilesh Rajavenkatanarayanan, Macomb, MI (US); Maureen Elizabeth August, Gross Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 18/544,968

(22) Filed: Dec. 19, 2023

(65) Prior Publication Data

US 2025/0200617 A1 Jun. 19, 2025

(51) Int. Cl.
| | |
|---|---|
| *G06Q 30/00* | (2023.01) |
| *B60R 25/24* | (2013.01) |
| *B60R 25/30* | (2013.01) |
| *G06F 21/36* | (2013.01) |
| *G06Q 30/02* | (2023.01) |

(Continued)

(52) U.S. Cl.
CPC ....... *G06Q 30/0278* (2013.01); *B60R 25/241* (2013.01); *B60R 25/305* (2013.01); *G06F 21/36* (2013.01); *G06Q 30/0633* (2013.01); *G06Q 30/0645* (2013.01); *G06Q 40/03* (2023.01);

(Continued)

(58) Field of Classification Search
CPC .............. G06Q 30/0278; G06Q 40/03; G06Q 30/0633; G06Q 30/0645; G06Q 40/0305;

G06Q 40/03055; G06Q 40/031; G06Q 40/032; G06Q 40/0325; G06Q 40/03251; G06Q 40/033; G06Q 40/034; G06Q 40/035; G06Q 40/036; G06Q 40/037; G06Q 40/038; G06Q 40/039; G06Q 30/0635; G06Q 30/06331; G06Q 30/06332; G06Q 30/06333; G06Q 30/06334; G06Q 30/0637; G06Q 10/083; G06Q 10/087;

(Continued)

(56) References Cited

U.S. PATENT DOCUMENTS

| | | | |
|---|---|---|---|
| 10,399,492 B1 * | 9/2019 | Paraskevas | .............. B60Q 9/00 |
| 2007/0168125 A1 * | 7/2007 | Petrik | ................... B60R 25/252 |
| | | | 701/469 |

(Continued)

FOREIGN PATENT DOCUMENTS

DE      102020118590 A1      1/2021

OTHER PUBLICATIONS

Firth: "Creating Vehicle-to-pedestrian Communication Using Transparent Window Displays," www.ti.com; Aug. 2019; 5pgs. (Year: 2019).*

*Primary Examiner* — Robert M Pond
(74) *Attorney, Agent, or Firm* — Vivacqua Crane, PLLC

(57) ABSTRACT

A system enabling vehicle evaluation for sale, lease and rent includes at least one sensor identifying a user approach to a vehicle. A vehicle window display is activated to present features of the vehicle for viewing by the user. A user gesture recognition system receives a request from the user, by user interaction with the display. A user identification document confirmation is used to authenticate the user. A user test drive of the vehicle is authorized when the user identification document confirmation is received.

16 Claims, 6 Drawing Sheets

(51) Int. Cl.
  *G06Q 30/0601*     (2023.01)
  *G06Q 30/0645*     (2023.01)
  *G06Q 40/03*       (2023.01)
  *G08G 1/00*        (2006.01)

(52) U.S. Cl.
  CPC ........ *G08G 1/205* (2013.01); *B60R 2325/205*
                                            (2013.01)

(58) Field of Classification Search
  CPC ............... B60R 25/241; B60R 25/305; B60R
                2325/205; G06F 21/36; G08G 1/205
  USPC ...................................................... 705/26, 27
  See application file for complete search history.

(56)                    References Cited

U.S. PATENT DOCUMENTS

2017/0282859 A1 * 10/2017 Grimm ................. H04W 12/08
2018/0204281 A1 *  7/2018 Painter ............... G06Q 30/0641
2019/0356677 A1 * 11/2019 Naserian .............. H04W 4/023
2020/0010051 A1    1/2020 Dumov
2021/0065275 A1 *  3/2021 Denthumdas .......... B60K 35/10
2021/0089120 A1 *  3/2021 Grimm ..................... G06T 7/73

* cited by examiner

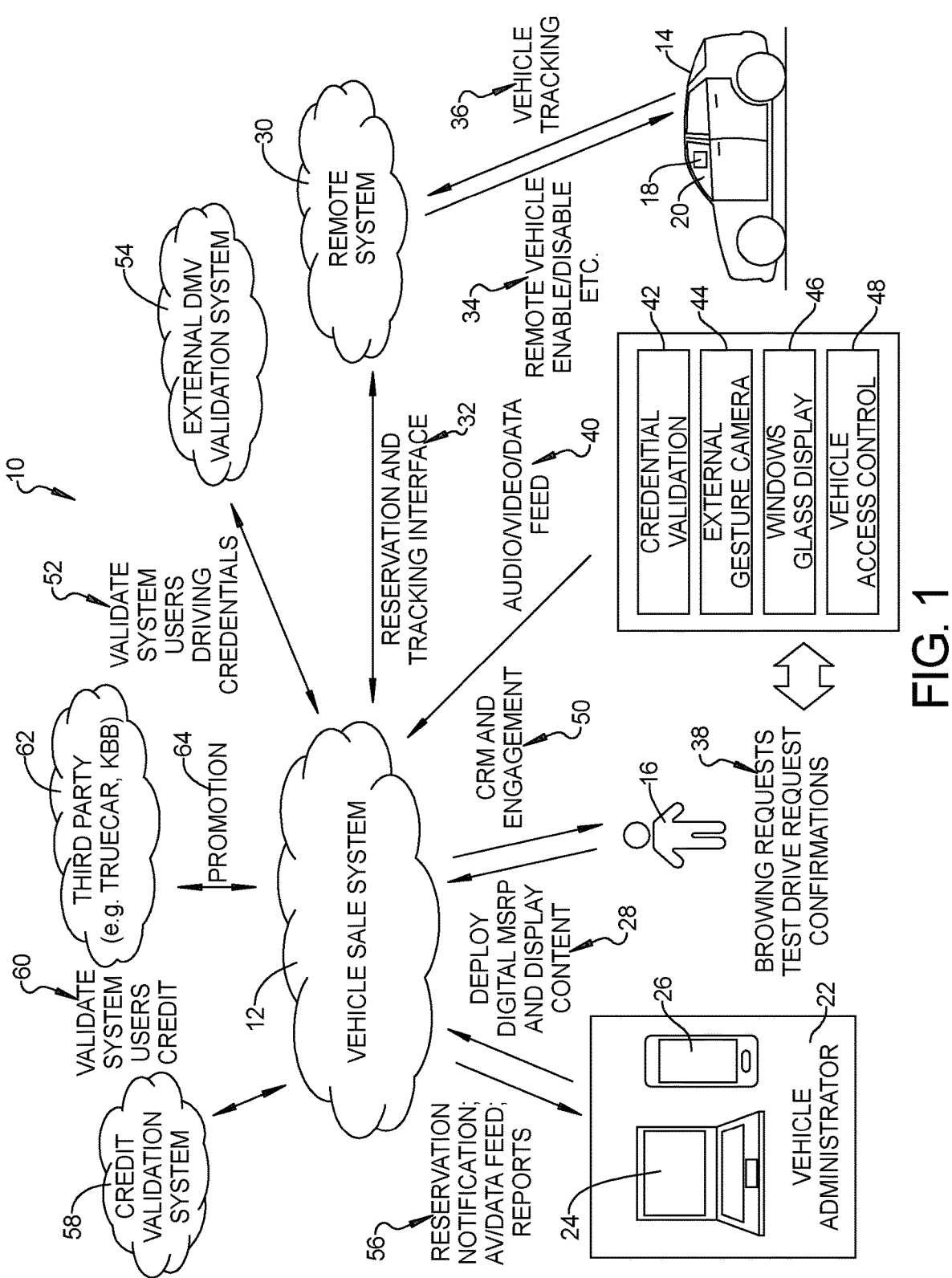

VEHICLE TRACKING 36

REMOTE SYSTEM 30

EXTERNAL DMV VALIDATION SYSTEM 54

REMOTE VEHICLE ENABLE/DISABLE ETC. 34

14
18
20

RESERVATION AND TRACKING INTERFACE 32

AUDIO/VIDEO/DATA FEED 40

CREDENTIAL VALIDATION 42

EXTERNAL GESTURE CAMERA 44

WINDOWS GLASS DISPLAY 46

VEHICLE ACCESS CONTROL 48

VALIDATE SYSTEM USERS DRIVING CREDENTIALS 52

10

THIRD PARTY (e.g. TRUECAR, KBB) 62

PROMOTION 64

VALIDATE SYSTEM USERS CREDIT 60

CRM AND ENGAGEMENT 50

VEHICLE SALE SYSTEM 12

16
38

BROWING REQUESTS TEST DRIVE REQUEST CONFIRMATIONS

DEPLOY DIGITAL MSRP AND DISPLAY CONTENT 28

CREDIT VALIDATION SYSTEM 58

RESERVATION NOTIFICATION; AV/DATA FEED; REPORTS 56

26
24
22

VEHICLE ADMINISTRATOR

FIG. 1

INTERACTIVE SYSTEM TO ENABLE VEHICLE EVALUATION AND SALE

INTRODUCTION

The present disclosure relates to vehicle data presentation to users.

Vehicle data including vehicle pricing and features is commonly presented on printed documents taped or adhered to windows of a vehicle. This present sales system provides limited information to prospective buyers or lessees and requires support from vehicle sales and financing personnel to facilitate vehicle access, to collect buyer information for credit checking and to accomplish a vehicle sale or lease.

Thus, while current systems and methods to provide information to vehicle users and prospective buyers and accomplish sale or lease achieve their intended purpose, there is a need for a new and improved system and method to present vehicle data.

SUMMARY

According to several aspects, a method enabling vehicle evaluation for sale, lease and rent comprises: identifying a user as the user approaches a vehicle; activating a display to present features of the vehicle on a window of the vehicle for viewing by the user; receiving a request from the user entered by a user interaction with the display; and authenticating user data entered by the user.

In another aspect of the present disclosure, the method further includes: reading a user identification document defining the user data employing a vehicle camera; and submitting data of the identification document to a credit agency to obtain a credit authorization of the user.

In another aspect of the present disclosure, the method further includes authorizing a test drive of the vehicle upon receipt of a positive response to the submitting of data.

In another aspect of the present disclosure, the method further includes: generating a digital key for operating the vehicle upon receipt of the positive response; and identifying an availability of the digital key to the user via the display.

In another aspect of the present disclosure, the method further includes: employing vehicle sensors to monitor the test drive; and saving summary data of the test drive to a log device.

In another aspect of the present disclosure, the method further includes commanding cessation of the test drive upon identification of violation of a predetermined criteria by the user.

In another aspect of the present disclosure, the method further includes monitoring an inward looking camera to identify user activity during the test drive and to generate a vehicle interior view for the display.

In another aspect of the present disclosure, the method further includes employing user gesture recognition defining the user interaction.

In another aspect of the present disclosure, the method further includes reading a user driver license as the user identification document presented to a camera of the vehicle by the user.

In another aspect of the present disclosure, the method further includes: initiating a purchase request or a lease request of the vehicle including submitting data entered by the user to a credit validation system to obtain a credit authorization of the user; and reporting a response from the credit validation system to a vehicle administrator and/or to the user.

According to several aspects, a system enabling vehicle evaluation for sale, lease and rent includes at least one sensor identifying a user approach to a vehicle. A vehicle window display is activated to present features of the vehicle for viewing by the user. A user gesture recognition system receives a request from the user by user interaction with the vehicle window display. A user identification document confirmation is used to authenticate the user. A user test drive of the vehicle is authorized when the user identification document confirmation is received.

In another aspect of the present disclosure, an inward-looking camera provides image data of the user present in the vehicle and identifying features of the vehicle interior presented on the vehicle window display; and an outward-looking camera identifying gestures made by the user is applied to activate the vehicle window display and/or to modify content of the vehicle window display.

In another aspect of the present disclosure, a digital key is generated for operating the vehicle upon receipt of the user identification document confirmation.

In another aspect of the present disclosure, a cell phone code-based confirmation is generated as the user identification document confirmation.

In another aspect of the present disclosure, an audio system audibly describes the features of the vehicle to the user.

In another aspect of the present disclosure, a remote system interacts via a reservation and tracking interface, the remote system providing a communication path with the vehicle including to transfer a remote vehicle enable/disable command, the remote system also receiving a vehicle tracking data set from the vehicle to locate the vehicle.

In another aspect of the present disclosure, the features of the vehicle include a projected content including vehicle make and model information, vehicle pricing information, vehicle build information, vehicle feature information and special sale information.

According to several aspects, a system enabling vehicle evaluation for sale, lease and rent includes at least one sensor identifying a user as the user approaches a vehicle. A vehicle window display is activated to present features of the vehicle for viewing by the user. A user gesture recognition system receives a request from the user by a user interaction with the window display. A user identification document confirmation is used to authenticate the user. A user test drive of the vehicle is authorized when the user identification document confirmation is received. A user sale, lease or rent of the vehicle is authorized when the user identification document confirmation is received.

In another aspect of the present disclosure, a computer having vehicle on-board inputs includes a computer vision input, an eye tracker input, a vehicle acceleration input, an external camera input, an automated driving system input and an external sensor input.

In another aspect of the present disclosure, the computer further includes vehicle off-board inputs including a vehicle to everything (V2X) input, a dedicated short range communication (DSRC) input, an internet and cellular input, a road database input, a global positioning system input and a directional audio input.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a system diagram of components and features of a system enabling vehicle evaluation for sale, lease and rent according to an exemplary aspect;

DETAILED DESCRIPTION

Figure 2:
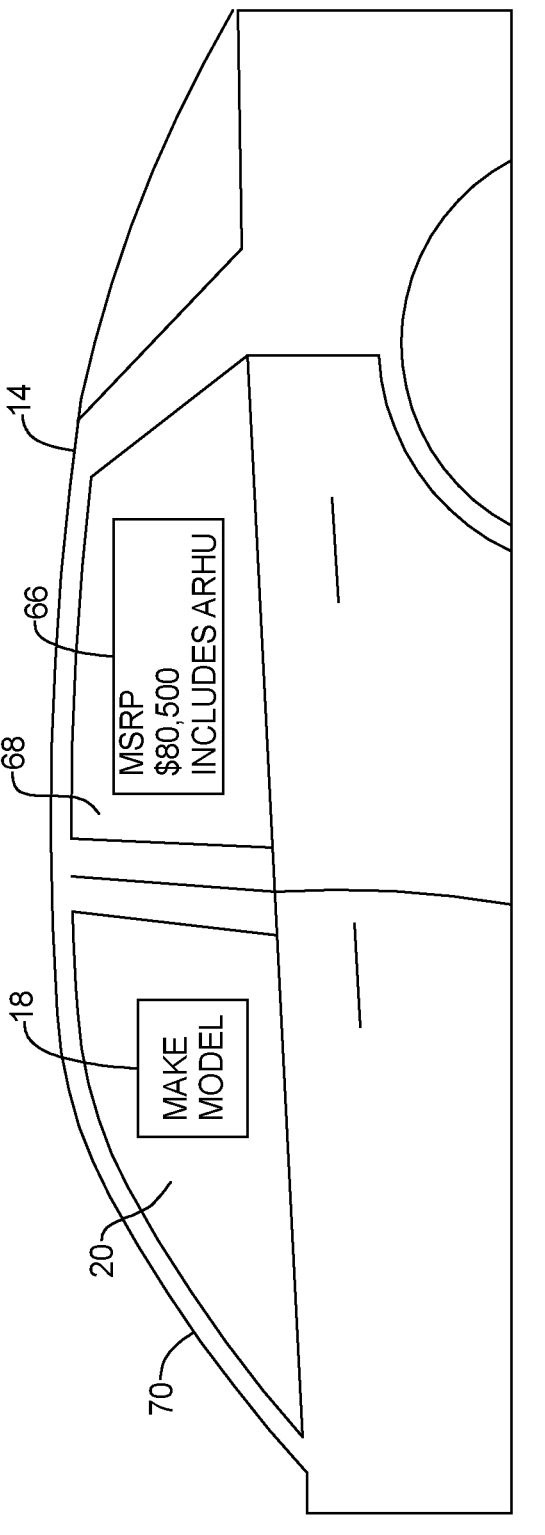
FIG. 2 is a side elevational view of a vehicle employing the system of FIG. 1.

The following description is merely exemplary in nature and is not intended to limit the present disclosure, application, or uses.

When a component, element or layer is referred to as being "on", "engaged to", "connected to", or "coupled to" another element or layer, it may be directly on, engaged, connected or coupled to the other component, element, or layer, or intervening elements or layers may be present. In contrast, when an element is referred to as being "directly on", "directly engaged to", "directly connected to", or "directly coupled to" another element or layer, there may be in intervening elements or layers present. Other words used to describe the relationship between elements should be interpreted in a like fashion, such as "between" versus "directly between", "adjacent" versus "directly adjacent", and the like. As used herein, the term "and/or" and "one or both" include any and all combinations of one or more of the associated listed items.

Referring to FIG. 1, a system enabling vehicle evaluation for sale, lease and rent, hereinafter the system 10 includes a vehicle sale system 12 which collects, stores and presents data of a vehicle 14, and receives requests from and permits access to a user 16 for operation of the vehicle 14 such as a test drive. According to several aspects, the vehicle sale system 12 may project a display defining a transparent display as a window display 18 providing the data of the vehicle 14 including but not limited to sales price, vehicle features including vehicle build information, vehicle feature information and feature pricing information as a projected content on one or more vehicle window surfaces and the like including one or more windows of the vehicle 14 such as a driver side window 20 shown, a passenger window, a windshield and/or a rear window. To minimize vehicle energy consumption, the system 10 intelligently activates based on a proximity of the user 16 to the vehicle 14 and enables interaction using user gesture sensing.

Initially, a vehicle administrator 22 inputs the data of the vehicle 14 into for example a computer portable display or unit 24 remote from the vehicle 14. Data input may also be made or modified using a hand-held device 26 such as a smart phone. A data packet 28 is either wirelessly or by hard connection uploaded to the vehicle sale system 12. The data packet 28 may include for example a digital manufacturer's suggested retail price (MSRP) of the vehicle 14 and a command to display the information contained in the data packet 28 using the transparent display as the window display 18.

Access to and tracking of the vehicle 14 is provided in part using a remote system 30 such as a cloud network. The remote system 30 interacts with the vehicle sale system 12 via a reservation and tracking interface 32 which may define a wireless interface protocol. The remote system 30 provides a communication path 34 with the vehicle 14 such as to transfer a remote vehicle enable/disable command. The remote system 30 also receives a vehicle tracking data set 36 from the vehicle 14, for example during vehicle test drives and to locate the vehicle 14 at any time including when parked. User requests 38 including data browsing requests, test drive requests and request confirmations are entered by the user 16 and transmitted to and from the vehicle sale system 12 via an audio/video data feed 40 from the vehicle 14. These include but is not limited to a credential validation request 42, an upload of data from an external gesture camera 44, a window glass display 46 interaction for the user 16 to enter requests or view request responses and/or a vehicle access control request 48. A user return signal 50 including but not limited to a customer relationship management (CRM) signal and an engagement confirmation signal may be returned from the vehicle sale system 12 to the user 16 via the transparent display as the window display 18 in response to a request entered by the user 16.

With continuing reference to FIG. 1, upon receipt of a request for a vehicle test drive the vehicle sale system 12 initiates a credential confirmation communication path 52 with an external department of motor vehicles (DMV) validation system 54. A response from the DMV validation system 54 is returned via the credential confirmation communication path 52 to the vehicle sale system 12, which may initiate and confirm a test drive reservation for the vehicle 14 or deny access of the vehicle 14 by the user 16 for a test drive. Data reports 56 including reservation requests and notifications, audio/visual (AV) data feed notifications and vehicle condition and operational reports are forwarded by the vehicle sale system 12 to the vehicle administrator 22 for information and to be saved as desired.

The user 16 may also initiate a purchase, a lease request or a rent request of the vehicle 14 via the vehicle sale system 12. To manage the purchase or lease request, the vehicle sale system 12 remotely interacts with a credit validation system 58 such as a credit agency using a user credit validation system link 60 to identify a user credit rating and to provide confirmation or authorization of user credit. The user credit validation system link 60 returns a response from the credit validation system 58 which may be reported to the vehicle administrator 22 and/or to the user 16 as a positive response or a negative response. The positive response signifying an acceptable credit rating or credit history may be applied to authorize or as a credit authorization to perform a test drive, and/or an authorization for a purchase credit a sale or a lease of the vehicle 14.

The vehicle sale system 12 may also communicate data of the vehicle 14 to a third party 62, such as a vehicle repair status provider, a new or used vehicle value provider, vehicle promotional data and the like. A promotion link 64 is provided between the vehicle sale system 12 and the third party 62 for communication of the vehicle data.

Referring to FIG. 2 and again to FIG. 1, according to several aspects, the user 16 shown in FIG. 1 may view projected content such as vehicle make and model information presented on the transparent display or window display 18 of the driver side window 20, and also view vehicle pricing information 66 by looking at projected content on transparent display projected onto a rear driver side window 68. The projected content may also include vehicle build information, vehicle feature information and special sale information. Projected content may also be provided on a vehicle windshield 70, or any desired vehicle window.

With continuing reference to FIG. 2, according to several aspects, multiple users may approach the vehicle 14 and view projected content on additional ones of the window displays 18 projected on additional windows. More than one test drive may be authorized, with later ones of the users validated and sequentially permitted to perform later test drives, which require the later user(s) to accept or reject.

Figure 3:
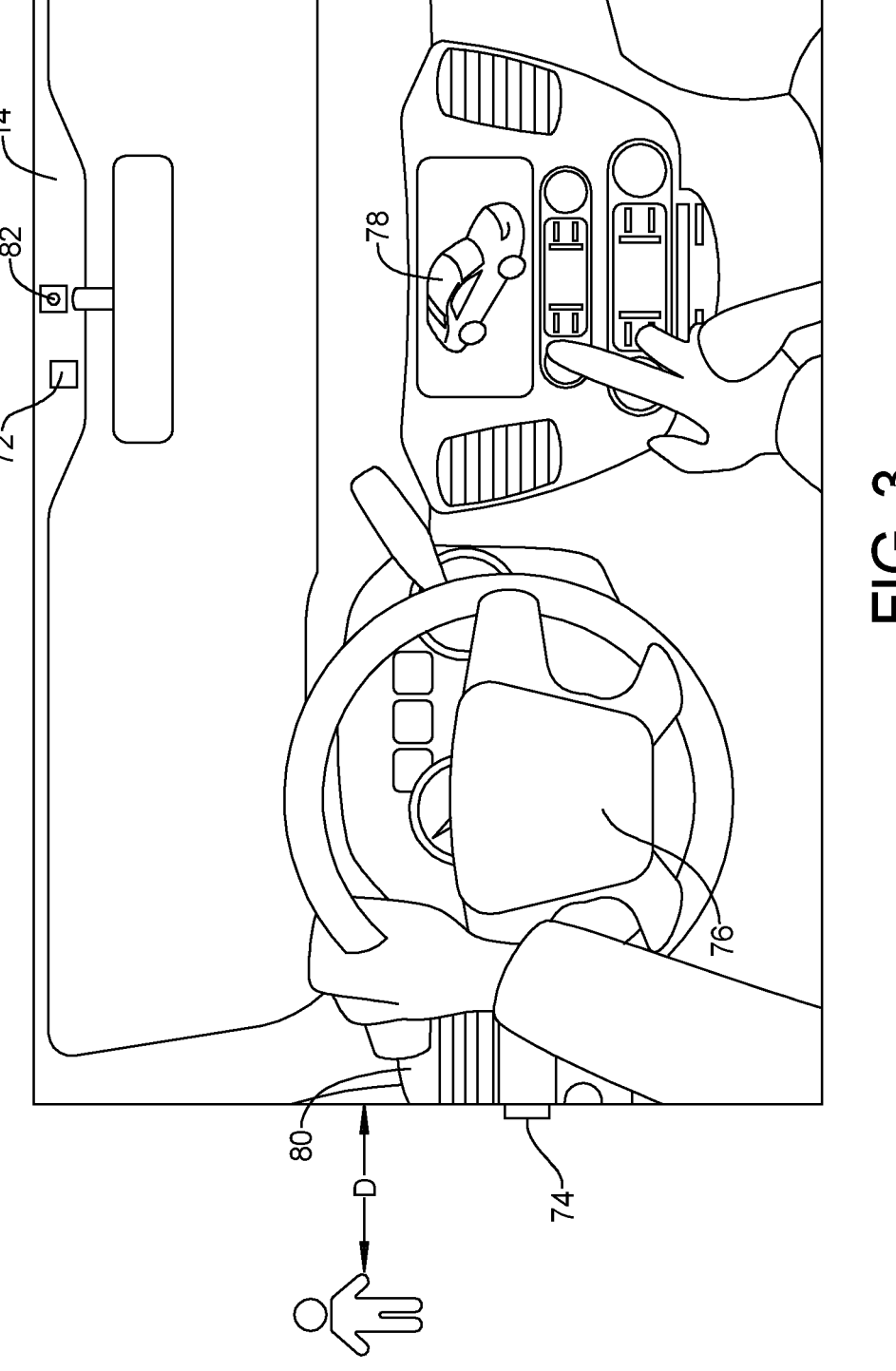
FIG. 3 is a perspective view looking forward of a vehicle interior employing the system of FIG. 1.

Referring to FIG. 3 and again to FIGS. 1 and 2, the system 10 intelligently activates based on a proximity or predetermined distance D between the user 16 and the vehicle 14 and enables interaction using user gesture sensing. User proximity and a user gaze may be determined using an in-vehicle outward-looking camera 72 or a similar externally mounted outward-looking camera 74 positioned on a surface of the vehicle 14 which may present a front view of the vehicle or a side view. Sensors such as a sensor 76 located in multiple locations of the vehicle 14, and input from one or more cameras such as the in-vehicle outward-looking camera 72 and/or the externally mounted outward-looking camera 74 identify specific predetermined gestures made by the user 16 which may also be applied to intelligently activate the transparent display or window display 18 of system 10 and/or to modify content of the transparent display or window display 18. A vehicle exterior projected view 78 and features of the interior of the vehicle 14 may be projected to the user 16. The user 16 may also interact with the external projection systems/displays. A directional audio system 80 is provided to verbally explain the vehicle features and may include one or more speakers to audibly provide information of the vehicle 14 to the user 16 and to audibly provide responses to the user 16 such as authorization to perform a test drive, responses to questions input by the user 16 and the like. An inward-looking camera 82 provides input to the system 10 of a user activity of the user 16 present in the vehicle 14 as well as identifying features of the vehicle interior.

Referring to FIG. 4 and again to FIG. 1, an operation flow diagram 84 identifies functional features of the system 10. According to exemplary aspects, the user 16 is presented as a vehicle buyer and the vehicle administrator 22 is presented as a seller of the vehicle 14. In an initial step 86 the user 16 as the buyer approaches the vehicle 14 and is sensed in an external sensing step 88. During the external sensing step 88 the user 16 is detected, the user 16 and any further persons are localized to identify a closest vehicle window, and commands are generated to activate a window display such as the transparent display or window display 18. Using a gesture recognition system 90, gestures made by the user 16 are sensed and categorized. In a display response step 92 the user 16 browses the transparent display and may interact with the transparent display such as by contact or a swiping motion proximate to the transparent display. One of the interactions made by the user 16 during the display response step 92 is to select a drive request 94 which permits the user 16 to conduct a test drive of the vehicle 14. Election of the drive request 94 initiates a credential check 96 to identify credentials of the user 16. The credential check 96 is forwarded to a validation server 98 which may be located on the remote system 30 such as a cloud based system discussed in reference to FIG. 1.

In addition to triggering the credential check 96, user election of the drive request 94 is also forwarded to a vehicle broker 99 which may include an intermediate sales agent. The vehicle broker 99 forwards the user's drive request 94 to the vehicle administrator 22 which is saved as a request receipt 100. The vehicle administrator 22 may elect to approve the user's drive request 94 and returns an approve message 102 to the remote system 30 which is logged as a received approval 104. Upon generation of the received approval 104 the vehicle 14 is notified and a confirmation 106 is generated which triggers the input step 90 to project the approval 104 to the user 16 via the external sensing step 88 onto the transparent display or window display 18 of the vehicle 14. In parallel with logging the received approval 104 a key generation 108 if performed to generate a digital key allowing the user 16 to enter and operate the vehicle 14.

The digital key created by the key generation 108 is forwarded to one or more vehicle control application programming interfaces (APIs) 110 which are comprised of a collection of resources that provide access to an array of automotive datasets related directly to the vehicle 14. The APIs 110 may generate a vehicle access code 112 which allow the user 16 to perform the functions of a test drive 114. The APIs 110 may conversely generate a vehicle disable code 116 as a cessation command to stop or end the test drive 114 if operation of the vehicle 14 during the test drive 114 meets a predetermined criteria. Upon generation of the vehicle disable code 116 multiple messages 118 are generated by the vehicle 14 which may include audio messages and/or driver pull-over commands.

Upon allowance and performance of the test drive 114 a data interpreter 120 is actuated on the remote system 30 to identify conditions sensed during the vehicle test drive 114. The data interpreter 120 is aided using a database of information retrieved via a Controller Area Network (CAN) 122 which is a vehicle standard designed to allow microcontrollers and devices to communicate with each other's applications without a host computer. The data from the data interpreter 120 is forwarded to a streaming device 124 which prepares video streaming and data streaming collectively defining summary data which is forwarded to a stream panel 126 of the vehicle administrator 22. An output of the data interpreter 120 is also forwarded to a decision tree 128 wherein a decision is made if logging of the summary data, such as a summary of the data of a test drive is active 130, which then forwards the summary data from the data interpreter 120 to a log device 132. A viewing device 134 of the vehicle administrator 22 in communication with the log device 132 permits the vehicle administrator 22 to view the logged data of the data interpreter 120. In the decision tree 128, if a decision is made that logging is not active 136, the data of the data interpreter 120 is forwarded for further analysis by a misbehavior decision tree 138. The misbehavior decision tree 138 identifies if a predetermined criteria such as vehicle speeding, data being blocked by a blocked vehicle camera and/or if a geofence is blocking receipt of information. If response from the misbehavior decision tree 138 is positive 140, a misbehavior signal is forwarded to the APIs 110 for use in determining if the vehicle test drive 114 may continue and is also forwarded to an alert device 144 of a viewing interface 146 of the vehicle administrator 22. A login device 148 is provided to permit the vehicle administrator 22 access to outputs of the stream panel 126, the viewing device 134 and/or the alert device 144. The login device 148 also provides administrative access to an account settings device 150 which provides access to add, delete or modify account settings.

A digital signature is required to accept a proposed contract to either purchase, lease or rent the vehicle 14. Features of the vehicle 14 may also be customized and a real-time price quotation will be generated if vehicle features are modified. If the vehicle 14 is to be rented, vehicle features may also be modified. For example, if an autonomously operated vehicle is desired, a rent price may change.

A portable display system may also be provided which is used in place of or in addition to the window display 18 for presentation of vehicle pricing and features. The portable display may also be used for both vehicle sale and vehicle lease presentations. The portable display may also be used to save vehicle battery power.

Figure 4:
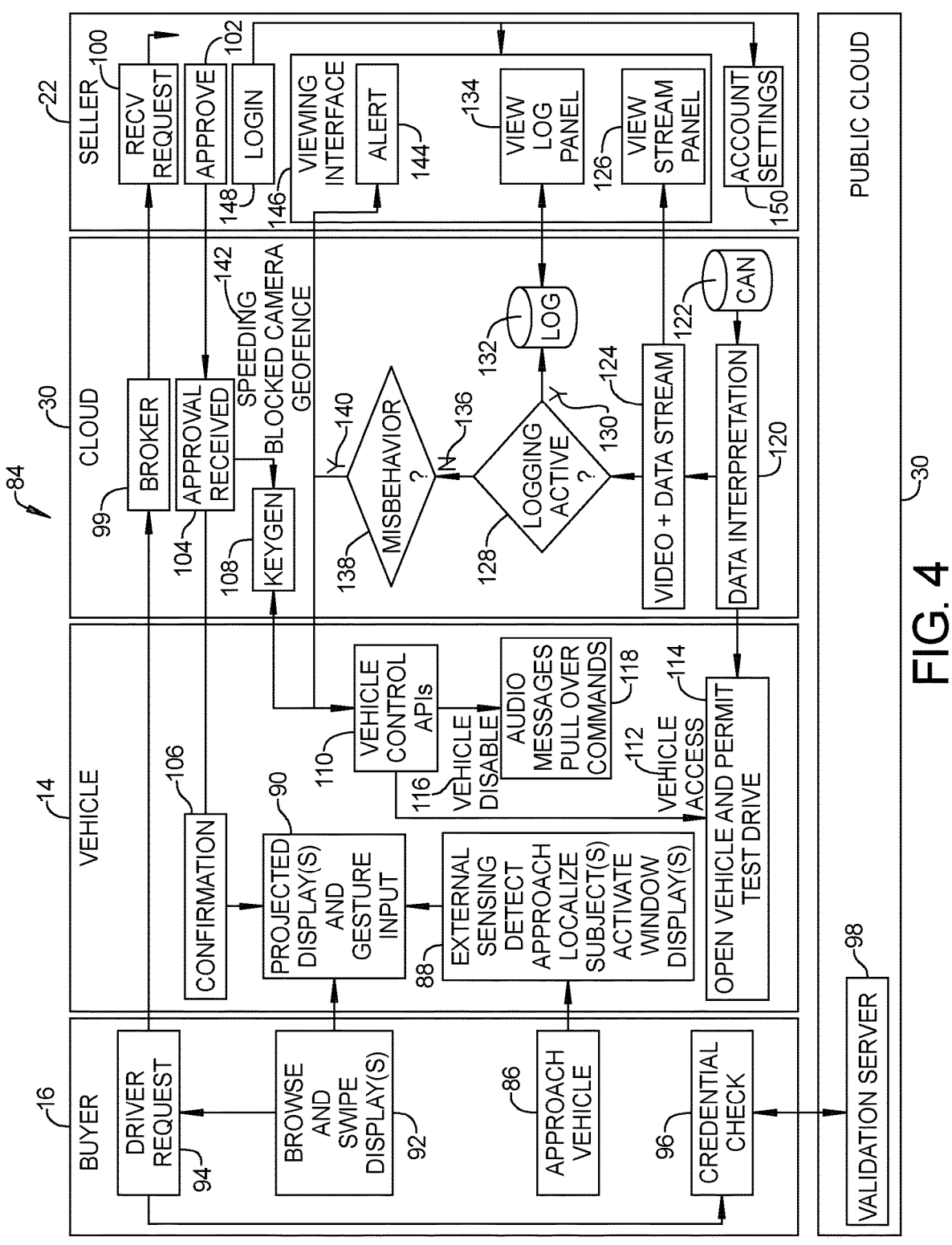
FIG. 4 is a flow diagram of a method to use the system of FIG. 1.
Figure 5:
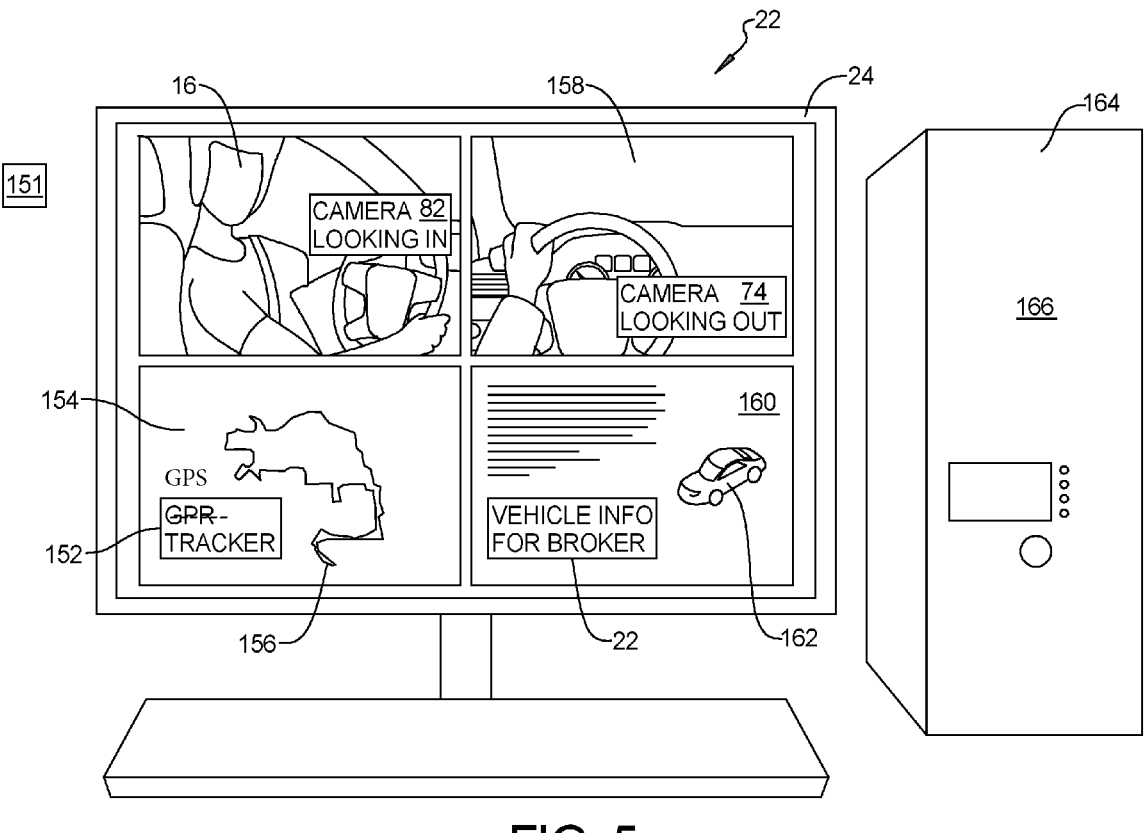
FIG. 5 is a front elevational view of a portable computer and monitor for use in operation of the system of FIG. 1.

Referring to FIG. 5 and again to FIGS. 1 and 4, the computer portable display or unit 24 as a portable display described in reference to FIG. 1 may be connected to a vehicle electronic control unit 151 and used to display vehicle information. The vehicle information may include a view from the inward-looking camera 82 looking into the vehicle 14 and showing for example activity of the user 16 defining a driver during the test drive 114. The vehicle information may also include a global positioning system (GPS) tracker provided with the vehicle 14 which generates a map 154 presenting a vehicle route 156 taken during the test drive 114. A view taken from the outward-looking camera 74 shown and described in reference to FIG. 3 may present a forward view of a road 158 in front of the vehicle 14 during the test drive 114. A vehicle data image 160 may also be presented which provides vehicle information 162 viewed and/or modified by the vehicle administrator 22 or broker. A computer 164 having a memory 166 may be used to generate and/or modify the views presented on the computer portable display or unit 24.

The computer 164 of the system 10 of the present disclosure may include an individual device such as a processor, a software component, an on-board computer or a remote located computer, collectively referred to as the computer 164. The computer 164 may be deployed in the host vehicle 14 with perception capabilities or may be remotely located such as in a cloud. The computer 164 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Figure 6:
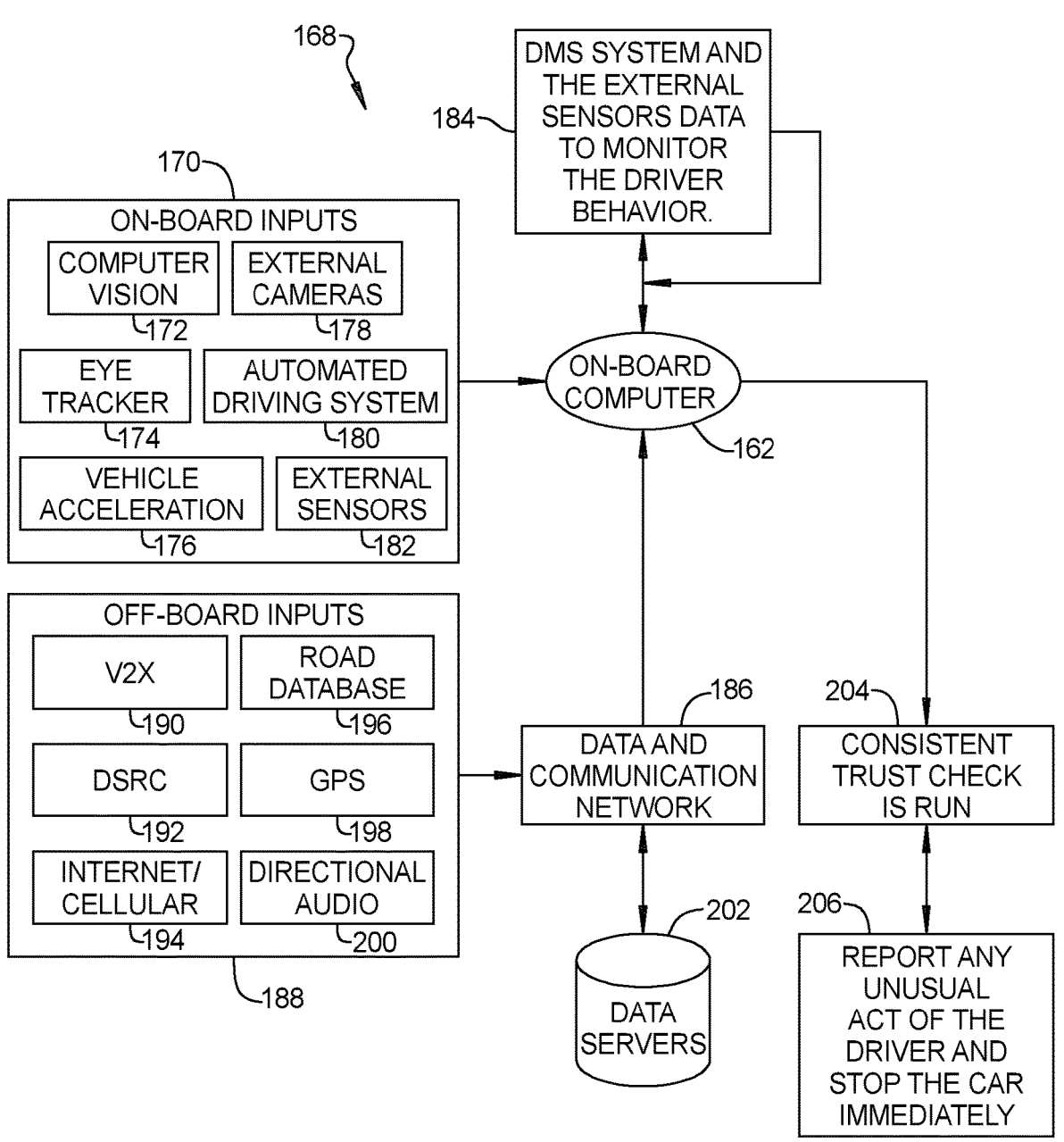
FIG. 6 is a system diagram of computer inputs for the system of FIG. 1.

Referring to FIG. 6, a system diagram 168 presents on-board and off-board inputs used by the system 10 of the present disclosure. The computer 164 which may define an on-board computer receives multiple inputs including vehicle on-board inputs 170 having a computer vision 172 input, a user eye tracker 174 input, a vehicle acceleration 176 input, one or more external camera 178 inputs, an automated driving system 180 input and multiple external sensors 182 inputs. The computer 164 communicates with and receives data from a dealership management system (DMS) 184 which gathers input data from multiple vehicle external sensors used to monitor the vehicle driver or user 16 behavior.

The computer 164 receives input from a data and communication network 186. The data and communication network 186 receives multiple inputs including vehicle off-board inputs 188 having a vehicle-to-everything (V2X) 190 input, a dedicated short range communication (DSRC) 192 input, an Internet and/or cellular 194 input, a road database 196 input, a GPS 198 input and/or a directional audio 200 input. Multiple data servers 202 are also in communication with the data and communication network 186. A consistent trust check 204 is run by the computer 164. A report 206 is generated using the consistent trust check 204 to identify any unusual act of the user 16 during the vehicle test drive 114. The report 206 may also include recommendations to issue a cessation command to stop the vehicle 14 if unacceptable vehicle operation occurs during the vehicle test drive 114.

In addition, foldable/portable displays may be added as a package for dealers and manufacturers for example during an auto show. These foldable/portable displays may be used at a vehicle dealership to provide vehicle evaluation information and sales information. This may lead to increased vehicle battery performance.

The system 10 of the present disclosure provides a method for presenting vehicle specification and feature information using a directional audio system and a projection system on vehicle glass. A vehicle test drive may be authorized if the user 16 presents valid credentials such as by presenting a driver license up to the outward-looking camera 74 coordinated by to the vehicle system 10 and enabled for scanning the user information, for conducting a reservation and for sending a code to the user 16 for example to a user cellphone. The outward-looking camera 74 takes a picture of the user 16 which is used by the system 10 to match the driver license photograph with the user 16.

The method of the present disclosure uses an exterior window glass transparent display and a directional audio system to promote vehicle sale. The method of the present disclosure uses an exterior window glass and gesture recognition system 90 to enable interactive content promotion to users/customers. The method of the present disclosure also uses the exterior window glass and gesture recognition system 90 to enable vehicle access, provide for vehicle evaluation and to promote vehicle sales. The method of the present disclosure uses an exterior camera to capture a picture of the user and a user's driver license prior to granting access to the vehicle 14 for a user inspection or a user test drive. The method of the present disclosure is useful at dealerships, rental car services and/or private seller locations.

The system 10 and method of the present disclosure offers several advantages. These include a system and method that authenticates the user 16 to allow for a test drive, monitors the user/driver and a vehicle route and stops the vehicle 14 if any violations of predetermined rules and regulations are detected. The system 10 activates a window display and external sensors to present a demonstration such as a video of the vehicle features and vehicle interior features. The system 10 provides vehicle access to the user for a test drive if requested and permitted. The system 10 includes: external and internal vehicle sensors and an eye/gaze tracker; external displays, directional audio and a gesture recognition system. The system also provides cloud services and algorithms to authenticate a test drive request; validates user credit and authorizes a vehicle sale. The method identifies a user/human interested in seeing a vehicle. The method authenticates the user 16 using details including a driver license and a cell phone code-based confirmation. The method monitors the test drive and stops and precludes further operation of the vehicle immediately if any predetermined rules are violated.

What is claimed is:

1. A method enabling vehicle evaluation for sale, lease and rent, comprising:

identifying a user as the user approaches a vehicle;

activating a display to present features of the vehicle on a window of the vehicle for viewing by the user;

receiving a request from the user entered by a user interaction with the display;

authenticating user data entered by the user;

reading a user identification document defining the user data employing a vehicle camera;

submitting data of the identification document to a credit agency to obtain a credit authorization of the user;

authorizing a test drive of the vehicle upon receipt of a positive response to the submitting of data;

monitoring an inward-looking camera to identify user activity during the authorized test drive and to generate a vehicle interior view for the display; and displaying vehicle information on a portable display remote from the vehicle, wherein the vehicle information includes the vehicle interior view and activity of the user during the authorized test drive captured by the inward-looking camera.

2. The method of claim 1, further including:

generating a digital key for operating the vehicle upon receipt of the positive response; and identifying an availability of the digital key to the user via the display.

3. The method of claim 1, further including:

employing vehicle sensors to monitor the test drive; and saving summary data of the test drive to a log device.

4. The method of claim 1, further including commanding cessation of the test drive upon identification of violation of a predetermined criteria.

5. The method of claim 1, further including employing user gesture recognition defining the user interaction.

6. The method of claim 1, further including reading a user driver license as the user identification document presented to a camera of the vehicle by the user.

7. The method of claim 1, further including:

initiating a purchase request or a lease request of the vehicle including submitting data entered by the user to a credit validation system to obtain a credit authorization of the user; and reporting a response from the credit validation system to a vehicle administrator and/or to the user.

8. A system enabling vehicle evaluation for sale, lease and rent, comprising:

at least one sensor identifying a user approach to a vehicle;

a vehicle window display activated to present features of the vehicle for viewing by the user;

a portable display activated to present vehicle information remote from the vehicle;

a user gesture recognition system receiving a request from the user by a user interaction with the vehicle window display;

wherein a user identification document confirmation used to is authenticate the user;

wherein a user test drive of the vehicle is authorized when the user identification document confirmation is received;

an inward-looking camera providing the vehicle information during the authorized user test drive, wherein the vehicle information includes image data of the user present in the vehicle and identifying features of the vehicle interior, and wherein the vehicle information is presented on the vehicle window display and the portable display; and an outward-looking camera identifying gestures made by the user applied to activate the vehicle window display and/or to modify content of the vehicle window display.

9. The system enabling vehicle evaluation for sale, lease and rent of claim 8, including a digital key generated for operating the vehicle upon receipt of the user identification document confirmation.

10. The system enabling vehicle evaluation for sale, lease and rent of claim 8, including a cell phone code-based confirmation generated as the user identification document confirmation.

11. The system enabling vehicle evaluation for sale, lease and rent of claim 8, including an audio system audibly describing the features of the vehicle to the user.

12. The system enabling vehicle evaluation for sale, lease and rent of claim 8, including a remote system interacting via a reservation and tracking interface, the remote system providing a communication path with the vehicle including to transfer a remote vehicle enable/disable command, the remote system also receiving a vehicle tracking data set from the vehicle to locate the vehicle.

13. The system enabling vehicle evaluation for sale, lease and rent of claim 8, wherein the features of the vehicle include a projected content including vehicle make and model information, vehicle pricing information, vehicle build information, vehicle feature information and special sale information.

14. A system enabling vehicle evaluation for sale, lease and rent, comprising:

at least one sensor identifying a user as the user approaches a vehicle;

a vehicle window display activated to present features of the vehicle for viewing by the user;

a portable display activated to present vehicle information remote from the vehicle;

a user gesture recognition system receiving a request from the user by user interaction with the vehicle window display;

wherein a user identification document confirmation used to is authenticate the user;

wherein a user test drive of the vehicle authorized is when the user identification document confirmation is received;

an inward-looking camera providing the vehicle information during the authorized user test drive, wherein the vehicle information includes image data of the user present in the vehicle and identifying features of the vehicle interior, and wherein the vehicle information is presented on the vehicle window display and the portable display;

an outward-looking camera identifying gestures made by the user applied to activate the vehicle window display and/or to modify content of the vehicle window display; and a user sale, lease or rent of the vehicle authorized when the user identification document confirmation is received.

15. The system enabling vehicle evaluation for sale, lease and rent of claim 14, including a computer having vehicle on-board inputs including a computer vision input, an eye tracker input, a vehicle acceleration input, an external camera input, an automated driving system input and an external sensor input.

16. The system enabling vehicle evaluation for sale, lease and rent of claim 15, the computer further including vehicle off-board inputs including a vehicle to everything (V2X) input, a dedicated short range communication (DSRC) input, an internet and cellular input, a road database input, a global positioning system input and a directional audio input.

\* \* \* \* \*